Patented Apr. 18, 1944

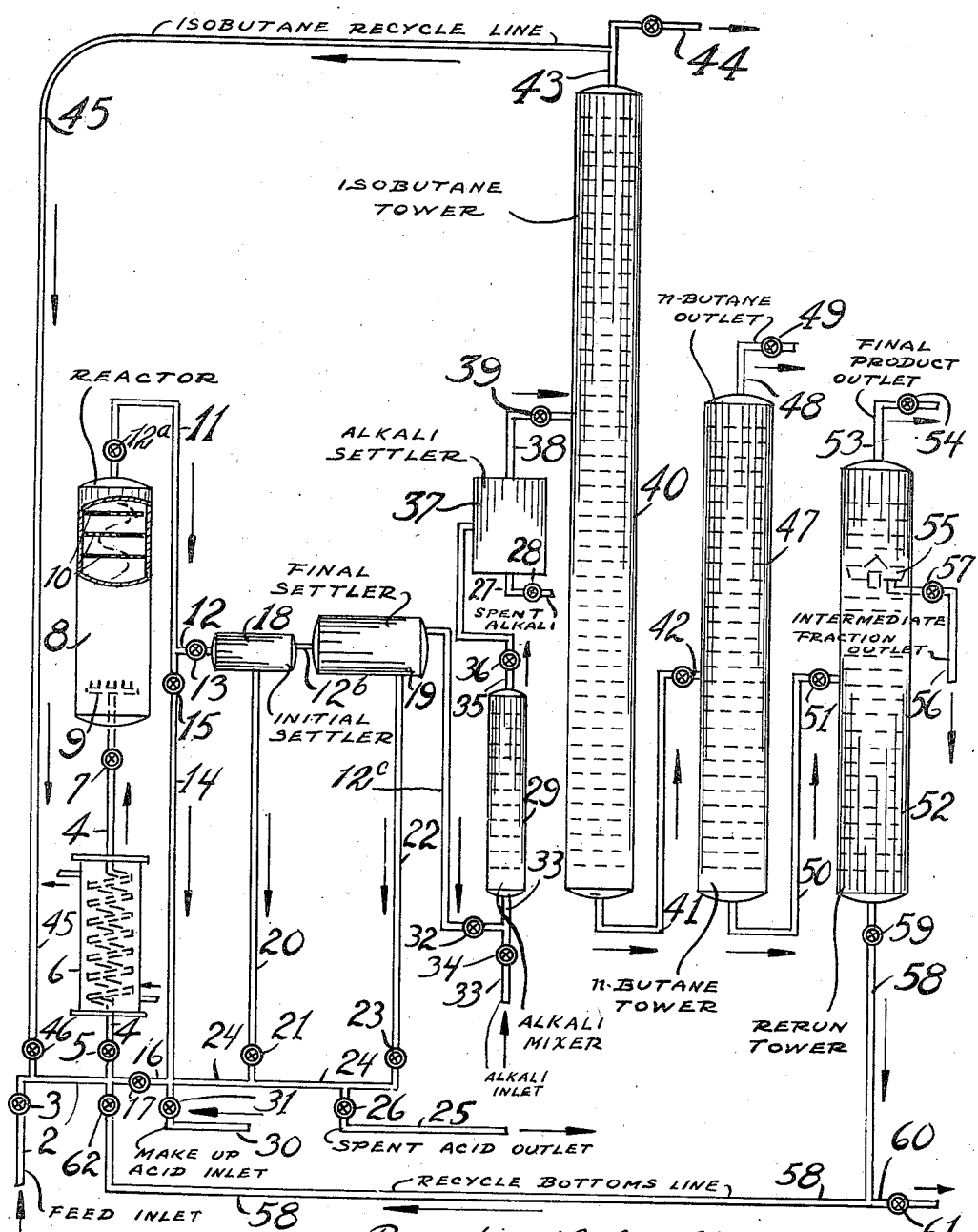

2,346,770

UNITED STATES PATENT OFFICE 2,346,770

CATALYTIC ALKYLATION PROCESS

Prentiss Lobdell, Elizabeth, and George L. Mateer, Roselle, N. J., assignors to Standard Oil Development Company, a corporation of Delaware Application February 27, 1939, Serial No. 258,640

8 Claims. (Cl. 260—683.4)

The present invention is directed to a method for the production of saturated hydrocarbons by the reaction between saturated hydrocarbons containing at least one tertiary carbon atom and olefins, preferably mono-olefins. The process of the present invention is directed more particularly to economical usage of those paraffins and olefins which are normally gaseous to produce normally liquid saturated hydrocarbons having high octane numbers and excellent lead susceptibility.

It has already been proposed to take advantage of this reaction of olefins with saturated hydrocarbons as well as with aromatic hydrocarbons by carrying out the process in the presence of such catalysts as concentrated mineral acids, such as sulfuric acid, metal halides, with or without the presence of alkyl halides, acid activated clays, boron trifluoride, sodium aluminum halide complexes and various other materials. The specific embodiment of this general reaction, which is of the greatest interest at the present time, is the reaction between isobutane and mono-olefins, such as normal butylenes and isobutylene, to form hydrocarbons boiling within the gasoline range and containing a considerable amount of isooctane and fractions suitable for aviation gasolines. The reaction between these tertiary carbon atom-containing paraffins and the mono-olefins has heretofore been carried out as a batch operation. Briefly, the previous practice has been to fill a reaction chamber with a mineral acid, for example, sulfuric acid having a strength of about 96% in which isobutane has been dissolved or dispersed. This reaction chamber is provided with a stirrer and is surrounded by a jacket in which a cooling medium adapted to maintain the reaction temperature below about 30° C. is circulating. The olefins, preferably composed largely of isobutylene and some normal butylenes, are then fed into the reaction chamber gradually with constant stirring, gradual addition of the olefins being dictated by the necessity for avoiding the excessive generation of heat in the reaction chamber. Various expedients have been resorted to to overcome the excessive generation of heat, such as the addition of the reactants in small increments, large cooling coils, auto refrigeration, jet dispersion and various other means. Stirring serves the purpose of preventing stratification and of assisting in the dissipation of the heat of reaction.

A batch operation of this type is attended with inherent difficulties. To begin with, the reaction is slow, and if it is to be carried out on a commercial basis, very large reaction vessels must be employed. The greater the size of the reaction vessel, however, the more acute become the problems of agitation and accurate temperature control. Furthermore, this procedure affords little or no accuracy in conducting the operation with uniform measured proportions of the reaction materials.

The present invention not only affords a method of accurately controlling the various proportions of reaction materials and activator, but also affords an extremely accurate means of cooling the reactor and of agitating the reactants in the reactor. One of the greatest advantages of the present process, however, lies in the control of the consumption of acid catalysts and reactants during the alkylation reactions. Heretofore it has been the problem to minimize the consumption of sulfuric acid during the alkylation and to obtain a ready and free source of supply of the isoparaffins as well as the olefins used. The process of the present invention is particularly adapted to the conservation of catalysts and reactants and at the same time using a minimum of operating equipment. Thus, the process of the present invention provides for the withdrawal of only the most spent acid from the reaction zones and for the substantially total conservation of the isobutane which may be in the reaction system, yet at the same time eliminating almost completely the normal butanes which are of no real value in the process and which are present as inert diluents.

Still another distinct advantage in the present process lies in the fact that a separation of the isoparaffins from the normal paraffins occurs after the reaction has gone to substantial completion. This means that the separation of the isoparaffins from the normal paraffins takes place in the absence of any substantial amount of olefins since the olefins have already been reacted to form normally liquid saturated hydrocarbons. Such a process has the advantage that a cleaner separation may be made since it would be almost impossible to cleanly separate the olefins and the isoparaffins from the normal paraffins by distillation from mixtures containing all three types of constituents. This advantage is readily apparent by a study of any of the standard physical tables of the various olefins and paraffins which are present in the normal refinery C₄ cuts. Isobutylene has a boiling point of −18° C., alpha butylene −6° C., and beta butylene +1° C. whereas normal butane has a boiling point of +.6° C. while isobutane has a boiling point of −10.2° C. As between the two C₄ paraffins, it will be seen that there is almost a 10° difference in boiling point whereas, as between the paraffins and the olefins in a C₄ cut, the greatest difference is only 8° C. and in several instances less than 6° C. difference in the boiling points. It will thus be seen that if the olefins can be removed first, a much cleaner separation of the isoparaffins from the normal paraffins can be made.

The invention is not limited to the use of any particular feed stock. Any paraffin or hydrocarbon mixture whose components include paraffins containing at least one tertiary carbon atom, be they liquid or normally gaseous, may be employed. However, for most desirable results, and for the greatest benefits to be derived from the use of this process, it is preferred to use a normally gaseous isoparaffinic hydrocarbon such as those which may be found in refinery $C_4$ cuts, field butanes, gases resulting from catalytic cracking, or thermal cracking, and the like. $C_5$ and $C_6$ isoparaffins, either in admixture with normally gaseous isoparaffins, as pure compounds, or as mixtures of isomers, may be employed.

Likewise, in the case of the olefinic reactant, it is only necessary that the reactant contain at least one double bond. Here again, either normally gaseous or liquid monomers or polymers may be employed, but it is to be understood that the preferred procedure lies in the use of the iso- and normal butylenes which occur chiefly in the refinery $C_4$ cut or in normally gaseous mixtures coming from catalytic and thermal cracking operations. The $C_3$, $C_5$, $C_6$, etc., mono-olefins, the pure compounds, their isomers, or admixtures of any or all of these types, may be employed as reactants. If desired, the feed may be blended so that the desired percentages and ratios of olefins to paraffins are adjusted before being fed into the process. Thus, normally gaseous mixtures coming from catalytic cracking units or thermal cracking coils may be admixed in the desired portions, or field butanes and refinery $C_4$ cuts, as well as the gas coming from primary distillations of crude oil, may be admixed to suit the exigencies of any particular case. In general, it may be said that a feed stock, such as a refinery $C_4$ cut which may contain up to about 45% of $C_4$ olefins, about 30% of isobutane, and about 40% to 60% of normal butane, is a highly desirable feed stock.

The process of the present invention may be suitably carried out using any of the well-known alkylation catalysts as previously pointed out. It is preferred, however, to use concentrated sulfuric acid, that is, sulfuric acid having a concentration between about 90% and about 110%, since this catalyst gives highly desirable results according to the process of the present invention. Other mineral acid catalysts, such as phosphoric, tetraphosphoric and chlorsulfonic acids, may be employed. In making up the feed stock for this alkylation process, it is desirable that the isoparaffins be present in slight molecular excess over the amount of combined mono-olefins present in the feed stock. It should also be kept in mind, however, that during the reaction proper, a large molecular excess of isoparaffin should be present, that is, of the order of 10, 20, or even 100 mols of isoparaffin per mol of olefin to be reacted. It will thus be seen that in order to maintain such a condition within the reaction zone, a recycle of the large excess of isoparaffin is required to secure efficient operation coupled with the production of high yields of reaction product based upon the total olefins fed. The observance of these molar ratios results in the production of high yields of iso-octane and/or stocks suitable for use in blending aviation gasoline of excellent octane number. The ratio of isoparaffins to olefins is maintained at the proper proportion by the regulation of the recycle stock, especially the regulation of the return feed line of the isoparaffin separated from the final product. Further control may be had by regulation of the quantity of acid-hydrocarbon mixture which is continuously recirculated about the reaction vessels.

As will be more fully hereinafter described, the objects of the invention are attained by control of the fractionating towers and by permitting the overhead from the initial tower, and possibly the bottoms from the final tower, to be returned to the alkylation zone. The accompanying drawing is not intended to be in any sense limiting but is intended to be purely illustrative of one of the modes of operation of the invention. The utility of the present invention is apparent from an explanation of the accompanying diagrammatic drawing thereof. In describing the drawing it will be distinctly understood that minor non-essential details, such as pressure valves, pumps, re-boilers, orifice meters, recording flow controllers, liquid level controllers and the like, have been omitted. Those skilled in the art readily understand the principles employed in their use and no detailed explanation is undertaken as to these conventional features.

A refinery $C_4$ cut containing, if necessary, extraneous isobutane, enters the process through line 2 and valve 3 entering cooler 6 by means of pipe 4 and open valve 5. Cooler 6 functions so that the feed stock entering reactor 8 has a temperature ranging from around 15° F. to around 125° F. with a preferred temperature of around 35° F. to around 70° F. In general, it may be stated that the lower the temperature of alkylation the lower the acid consumption will be. Cool feed stock leaves cooler 6 through pipe 4 and open valve 7 and is introduced into reactor 8 by means of a dispersion device 9. Any suitable dispersion device may be used, such as a jet, turbo mixer, orifice mixer, or mechanical agitators such as motor driven stirrers and the like. Here, in reactor 8, the isoparaffins and olefins are given time to largely complete their reaction, and baffle plate 10 aids in keeping them well mixed. The reacted mixture flows through pipe 11 by means of open valve 12a and then is divided into two streams.

The major part of the reacted mixture flows through pipe 14 controlled by valve 15 and pipe 16 controlled by valve 17 into pipe 4 controlled by valves 5 and 7 and cooler 6 and thence into the reactor as before. The rest of the reacted mixture is allowed to flow through pipe 12 controlled by valve 13 into initial settler 18 where the acid is removed through pipe 20 and valve 21, and may be either returned to the reaction zone by pipes 24, 16 and 4 or may be withdrawn through pipes 24 and 25 by closing valves 31 and 23 and opening valve 26. In general, however, it is preferred to return the acid in line 20 to the reaction zone since it is only partially exhausted. The hydrocarbon and some entrained acid is conducted by pipe 12b into the final settler 19 where the remaining acid is withdrawn through pipe 22 by means of open valve 23 and withdrawn from the system thru line 25 by means of open valve 26.

The hydrocarbon mixture flowing from the final settler is conducted by means of pipe 12c and open valve 32 into pipe 33 and then to the alkali mixer 29, fresh alkali being introduced into pipe 33 by means of valve 34 and mixing with the hydrocarbon product in mixer 29. Alkali entering mixer 29 through pipe 33 and valve 34 is usually about a 2% aqueous solution of caustic soda. Such a concentration of alkali effectively removes all traces of the acid catalyst and at the same time prevents any serious corrosion in the subsequent distillation equipment. After having been thoroughly mixed, the hydrocarbon product leaves mixer 29 through pipe 35 by means of open valve 36 and is introduced into the alkali settler 37 where the spent alkali is withdrawn through line 27 and open valve 28 and the neutralized hydrocarbon product is conducted by means of pipe 38 and open valve 39 into the isobutane tower 40.

Throughout the process involving the apparatus as explained up to the present moment, the entire system is maintained preferably under sufficient superatmospheric pressure to insure the reactants remaining in the liquid state under the conditions of reaction. It is contemplated and feasible to carry out the process in the vapor phase. However, it has been found economically more advisable to maintain a liquid phase operation. Pressures ranging from a few pounds above atmospheric up to about 1800 to about 3000 lbs. have been employed, depending upon the catalyst employed. However, pressures ranging from about 100 to about 250 lbs./sq. in. are preferred.

A neutralized saturated liquid hydrocarbon product entering the isobutane tower 40 is flashed at this point under a pressure of 75 lbs./sq. in., top portion of the tower being maintained at a temperature between about 100° F. and about 130° F. while the bottom temperature is maintained between about 150° F. and about 200° F. Depending upon the type of feed stock customarily employed, the number of plates in this tower will vary. However, it has been found for a typical refinery $C_4$ feed that some 50 to 60 plates are sufficient, with suitable refluxing, to remove from the top of the tower through pipe 43 80–100% isobutane with the remainder being normal butane. Various conditions maintained at the top and bottom of this tower may be employed, the specific temperatures and pressures stated being typical of those which might be used. Using such conditions, the fluid in pipes 43 and 45 will contain about 90% of isobutane and about 10% of normal butane. If desired, even purer isobutane may be flashed from this tower, suitable modification of the equipment being required. The isobutane may be either recycled to the feed line to the reactor 8 or it may be withdrawn from the system through pipe 44. Usually, however, it is preferred to return to feed line 2 by means of pipe 45 controlled by valve 46 substantially all of the isobutanes separated from tower 40. If desired, feed line 45 containing the isobutane to be recycled may be connected directly to line 16 (not shown in the diagram) so that the isobutane is used to maintain the excess molar ratio of isobutane to olefins in the line 4 to the reactor 8.

The effluent from the bottom of the isobutane tower 40 is passed by means of pipe 41 and open valve 42 into the normal butane tower which is constructed similarly to the isobutane tower 40, except that it does not have as many fractionation plates or bubble cap trays as the former. The effluent from tower 40, upon entering tower 47, has the pressure further reduced to about 50 lbs./sq. in. The temperature at the top of the tower is maintained at about 100° F. to about 130° F. and the temperature at the bottom of the tower is maintained at about 280° F. to about 330° F. Here again considerable flexibility is provided for in this tower. Substantially all of the remaining normal butane, namely, that amount of normal butane which is not taken over in line 43, may be removed through line 48 and open valve 49. However, it may be desirable to permit a certain percentage of the normal butane to remain in the final product if high volatility gasoline is desired. However, for the production of iso-octane, aviation gasoline, or safety fuel, it is normally desired to take out substantially all of the normal butane and it is in the normal butane tower that the conditions of operation are so carried out to accomplish this purpose. It will be noted that the normal butane which entered the reaction system through feed line 2 remains substantially unchanged throughout the entire alkylation process, hence, unless it were removed from the system it would build up to considerable proportions and would seriously hamper the efficient operation of the alkylation process. It is therefore practically essential to the successful operation of the invention that this tower 47 be included in the equipment to take care of the normal butane portion of the final product. In cases where the supply of field butanes or the supply of isobutanes is distinctly limited, it may be desirable to take the effluent from pipe 48, catalytically dehydrogenate it to produce olefins for use in the alkylation reaction, to treat the normal butane with catalysts which tend to promote the formation of isobutane therefrom, or to catalytically dehydrogenate the isobutane so formed by such treatment to produce isobutylene for ultimate use in the alkylation reaction. Considerable flexibility, it will be seen, is obtainable in the use of the normal butane effluent from tower 47. The bottoms from tower 47 pass through line 50 and open valve 51 into the final fractionation tower 52 which is operated at atmospheric pressure. Any desired number of trap-out trays and outlets may be maintained in this tower. For the purposes of illustration, trap-out tray 55 is shown provided with lead-off line 56 and valve 57 to collect an intermediate fraction. The final product is distilled over through line 53 and open valve 54 and the bottoms are taken off through line 58 and valve 59. For operating this final fractionating tower a temperature of about 240° F.–280° F. at the top and a temperature from about 280° F. to about 330° F. at the bottom is maintained. These temperatures are purely typical and are not intended to be limiting in any way. It is at once readily recognized by those skilled in the art that this column may be operated so as to produce any desired number of fractions of suitable boiling ranges within the entire boiling range of the final product entering the tower 52 through line 50. Thus, if a safety fuel is desired, the temperature of the trap-out tray 55 could be maintained within the desired boiling range, light products coming overhead through line 53 being either recycled to the original reactor for further reaction or utilized in other ways. Likewise the bottoms from such an operation could be recycled through line 58 controlled by valve 62 to line 4 or they could be withdrawn through line 60 and valve 61. Column 52, it will thus be seen, is capable of a large variety or different types of operation.

To compensate for the spent acid which is removed through line 25 controlled by valve 26, a make-up acid inlet line 30 controlled by valve 31 is connected with the acid-hydrocarbon recycle line.

From a practical standpoint the process of the present invention is a distinct advance in the art. It will be seen, after having understood the process presented in the diagrammatic drawing, the necessity for any large number of pumps has been eliminated since the use of decreasing pressures serves to move the reactants through the various lines. Considerable savings in heat, such as fire and steam used in ordinary distillation processes, is effected since there is no effluent emerging from the tops of either of the three fractionating towers which must be distilled and condensed more than once. Such a process, it will be apparent, is economical. One of the principal advantages of the present process lies in the effective separation of the normal from the isobutane, both cuts being substantially free of olefins, whereas an attempted separation of such cuts from a mixture containing olefins by a distillation process, such as would occur before alkylation of the C₄ cut, would be of little value because of the loss of the olefin reaction in the normal butane fraction.

The nature and objects of the present invention having been thus described and illustrated, what is claimed as new and useful and desired to be secured by Letters Patent is:

1. A process which comprises reacting normally gaseous mixtures of hydrocarbon containing between about 20% and about 40% of normal- and iso-butylenes, between about 10% and about 30% of isobutane, and between about 30% and about 65% of normal butane, at a temperature between about 15° F. and about 125° F., at a pressure between about 100 and about 3000 lbs./sq. in. in the presence of sulfuric acid having a concentration between about 80% and about 110%, continuously recycling most of the reaction mixture to the alkylation zone in the presence of a molar excess of isobutane, continuously withdrawing the rest of the reaction mixture, separating the reaction product from the sulfuric acid, returning the separated partially spent acid to the reaction zone, treating the normally liquid reaction product with about 2% aqueous caustic soda solution, separating the spent soda solution therefrom, flashing from the neutralized normally liquid paraffinic product a mixture comprising essentially only isobutane and lighter hydrocarbons, returning said isobutane mixture to the alkylation process, still further reducing the pressure on the reaction product and flashing off a mixture comprising essentially only normal butane and fractionating the bottoms therefrom to the boiling range of the desired motor fuel.

2. A process as in claim 1 wherein the bottoms from the final fractionation, to produce the final motor fuel fraction, are returned, at least partially, to the alkylation process.

3. A process which comprises reacting a refinery C₄ cut containing normal and isobutylenes, normal and isobutane, wherein the isobutane is present in substantial molar excess over the total olefinic content of the reaction mixture, at a temperature between about 35° F. and about 70° F., under a pressure sufficient to maintain the reactants in the liquid phase under the reaction conditions obtaining, in the presence of sulfuric acid having a concentration between about 90% and about 100%, continuously recycling most of the reaction mixture to an alkylation zone in the presence of the heretofore mentioned molar excess of the isobutane, continuously withdrawing from the cycle a portion of the reactant mixture, separating the hydrocarbons from the sulfuric acid, returning the partially spent acid layer to the reaction zone, treating the hydrocarbon layer with dilute caustic soda solution, separating the soda solution therefrom, flashing from the neutralized hydrocarbon layer a mixture comprising essentially only isobutane and lower boiling hydrocarbons, returning said mixture to the alkylation reaction zone, independently and subsequently flashing from the residual liquid product a mixture comprising essentially only normal butane, and fractionating the bottoms therefrom to the desired boiling range of motor fuel.

4. In a process of producing normally liquid, saturated, branched chain hydrocarbons boiling within the gasoline range by reacting a paraffin mixture containing isoparaffin and normal paraffin wherein both types of paraffins have the same number of carbon atoms per molecule with a monoolefin, the isoparaffin being in substantial molar excess over the monoolefin, in the presence of an alkylation catalyst under alkylation reaction conditions, the improvement which comprises separating from the reacted mixture a fraction comprising essentially only unreacted isoparaffin and any lighter hydrocarbons formed followed by the separation from the resulting residual reacted mixture of a fraction comprising essentially only normal paraffin and at least partially introducing the isoparaffin of the first separated fraction into an alkylation reaction.

5. In a process of reacting an isoparaffin-normal paraffin mixture wherein both types of paraffins have the same number of carbon atoms per molecule with a monoolefin, the isoparaffin being in substantial molar excess over the monoolefin, in the presence of concentrated sulfuric acid of alkylating strength, under alkylation reaction condition to obtain normally liquid, saturated, branched chain hydrocarbons, the steps comprising fractionating the reacted mixture substantially freed of sulfuric acid to remove substantially only unreacted isoparaffin and lighter hydrocarbons, returning said unreacted isoparaffin to the alkylation reaction and separately fractioning the resulting residual reacted mixture to remove substantially only the unreacted normal paraffins contained therein.

6. A process as in claim 4 wherein the reactants are refinery C₄ cuts containing iso and normal butanes, iso and normal butenes, wherein the paraffin fraction separated initially comprises essentially only isobutane and lighter hydrocarbons, said fraction being at least partially returned to the alkylation reaction, and wherein the fraction separated from the resulting residual reacted fraction comprises essentially only normal butane.

7. A process as in claim 5 wherein the alkylation process is carried out under at least sufficient superatmospheric pressure to maintain the reactants in the liquid phase under the reaction conditions obtaining, wherein the pressure is sufficiently high and is released at least partially so as to effect a release of the initial fraction of isoparaffin and lighter hydrocarbons from the reacted mixture by flashing, and wherein the pressure is sufficient on the resulting residual reacted mixture and is released partially so as to effect a release of the second overhead normal paraffin fraction by flashing.

8. A process as in claim 5 wherein the reactants are a refinery C₄ cut containing iso and normal butanes, iso and normal butenes, wherein the isoparaffin and lighter hydrocarbon fraction comprises substantially only isobutane and lighter hydrocarbons, and wherein the normal paraffin fraction comprises substantially only normal butane.

PRENTISS LOBDELL.
GEORGE L. MATEER.